United States Patent
Woollard et al.

[19]

[11] Patent Number: 6,042,885
[45] Date of Patent: Mar. 28, 2000

[54] SYSTEM AND METHOD FOR DISPENSING A GEL

[75] Inventors: Douglas J. Woollard, Leiss; John H. Sharrock, Northampton, both of United Kingdom

[73] Assignee: ABITEC Corporation, Columbus, Ohio

[21] Appl. No.: 09/062,164

[22] Filed: Apr. 17, 1998

[51] Int. Cl.[7] .................................. B05D 7/22; B05C 5/00
[52] U.S. Cl. ............................. 427/236; 118/24; 118/28; 118/30; 118/306; 427/239; 427/240; 427/425
[58] Field of Search .................................. 427/240, 236, 427/385.5, 238, 239, 425, 388.1, 386; 118/306, 28, 24, 30

[56] References Cited

U.S. PATENT DOCUMENTS

| | | |
|---|---|---|
| 4,096,258 | 6/1978 | Hanson . |
| 4,192,898 | 3/1980 | Hanson .................................. 426/250 |
| 4,272,567 | 6/1981 | Blukesler et al. ........................ 427/236 |
| 4,294,408 | 10/1981 | Snyder et al. ......................... 239/218.5 |
| 4,392,614 | 7/1983 | Groth et al. ............................. 239/215 |
| 4,547,388 | 10/1985 | Strouss .................................... 250/578 |
| 5,147,676 | 9/1992 | Talbot .................................... 426/601 |
| 5,186,979 | 2/1993 | Ballenger, Jr. et al. ................. 427/156 |

*Primary Examiner*—Janyce Bell
*Attorney, Agent, or Firm*—William R. Bachand; Squire, Sanders & Dempsey L.L.P.

[57] ABSTRACT

Application of a release agent onto the interior surfaces of a commercial bakery trough is accomplished by a system for dispensing a gel having two spray head assemblies. While the trough is stationary, each head in turn descends into the trough and propels the release agent onto a portion of the interior surfaces including side walls, an end wall, and the bottom wall of the trough. Each head includes a disc that spins to distribute the release agent. An edge on the disc defines a predetermined spray pattern. Waste of release agent due to overspray is minimized by controlling a release agent valve in the head, controlling disc rotation, and monitoring position of the head in the trough.

48 Claims, 8 Drawing Sheets

SYSTEM AND METHOD FOR DISPENSING A GEL

FIELD OF THE INVENTION

The present invention relates to systems and methods for dispensing a gel onto a surface.

BACKGROUND OF THE INVENTION

As an introduction to some of the problems solved by the present invention, consider a conventional commercial bakery having a sponge dough mixer that delivers dough into a trough for transport to the next production station, such as a loaf forming station. To prevent dough residue from forming on the interior surfaces of the trough, a release agent (in liquid or emulsion form) is conventionally applied by spraying the release agent through an atomizing nozzle under air pressure. The release agent acts as a lubricant on the surfaces sprayed.

Overspray of release agent is costly in both direct and indirect costs. Overspray wastes material. Release agent on nearby surfaces may decrease product quality, and present well known health and safety hazards to bakery production line operators. Overhead costs increase due to overspray including costs for cleanup, safety education, and insurance for injury.

Application of release agent by conventional pressure spraying is inefficient in several ways. By atomizing the release agent under high pressure, droplets of a wide range of sizes nonuniformly coat the trough and surrounding surfaces, and remain aloft in the working atmosphere of the production line. Not only is the repeatable extent of the coating difficult to maintain, but also well known health and safety hazards are presented by the airborne droplets which may be inhaled. Attempts to regulate droplet size in order to improve repeatability are made difficult at least by variation in air pressure, air temperature, nozzle orientation, and nozzle cleanliness.

Conventional methods for dispensing a gel and for applying viscous liquid to the surfaces of an open vessel cannot be used in a food processing environment for lack of speed, continuity, sanitation, or repeatability in application; or for failure to reduce costs, improve efficiency, and minimize health and safety risks.

SUMMARY OF THE INVENTION

A system in one embodiment of the present invention for dispensing a gel includes a distributor and a motor. The distributor includes a hub having an axis of rotation and a surface. The surface turns with the hub and extends away from the axis toward an edge of the surface. The surface includes an opening for passage of the gel through the surface. The motor spins the distributor on the axis, thereby dispensing the gel in a first pattern off the edge and in a second pattern through the opening.

By dispensing the gel from the edge, droplet size is uniform and the dispensing pattern from the edge is well defined, allowing accurate positioning of the pattern, efficient and repeatable coating of a surface, and the reduction of overspray. The coverage of a vessel surface is consistently even. The area around the system remains clean and sanitation is easier to maintain.

A variation includes a valve. The valve regulates delivery of the gel onto the distributor. By controlling the motor rotation and the valve in concert, the dispenser is self-cleaning. Self-cleaning helps to maintain the repeatability of the spray patterns and the cleanliness of the system and surrounding equipment.

In another variation, the system further includes a support and a controller. The support carries the motor and the valve, and positions the first pattern by moving the first pattern in a direction along the axis. The controller commands opening of the valve in concert with controlling the rotation of the motor.

A method, in one embodiment of the present invention, for operating a system of the type described above, dispenses the gel into a vessel having an opening and an interior surface. The method includes: (1) operating the support to introduce the distributor through the vessel opening; (2) initiating rotation of the distributor; (3) opening the valve when the distributor is rotating and is positioned to dispense the gel onto the vessel interior surface; (4) operating the support to move the pattern along the vessel interior surface; and (5) in sequence: closing the valve, reducing distributor rotation, and operating the support to remove the distributor from the vessel opening.

By controlling the valve and motor rotation in concert, the distributor, when moved into and out of the vessel, exhibits self-cleaning and lack of overspray for safe and efficient dispensing.

Use of a gel dispensing system or method of the present invention may reduce the amount of gel consumed in a particular application by as much as 40 percent over use of conventional systems.

BRIEF DESCRIPTION OF THE DRAWING

FIG. 1 is a functional block diagram of a system of the present invention.

FIG. 2 is a front view of a system for applying a gel to a vessel in an embodiment of the present invention.

FIG. 3 is a cross section view of a portion of the system of FIG. 2.

FIG. 4 is a cross section view of head 212 of FIG. 2.

FIG. 5 is a top view of distributor 214 of FIG. 2.

FIG. 6 is a flow chart of a method of operation of the system in FIG. 2.

FIG. 7 is a timing diagram illustrating the position of heads 212 and 222 of FIG. 2.

FIG. 8 is a graph of viscosity vs. temperature for gels used in variations of system 100 of FIG. 1.

DETAILED DESCRIPTION OF THE PREFERRED EMBODIMENTS

A system of the present invention applies a gel to a workpiece surface. For example, system 100 of FIG. 1, adapted for applying release agent to commercial bakery troughs, includes spray head 110, delivery system 112 for delivering a gel to head 110, and dispensing controller 114 that operates the head and the delivery system in concert. The cooperation of head 110, delivery system 112, and controller 114 is sufficient for some applications usually involving manual positioning of a workpiece (not shown) in relation to head 110. In other applications, for example involving large workpieces, system 100 further includes positioning system 116 for moving head 110 in relation to the workpiece and/or moving the workpiece in relation to head 110.

A gel supply and delivery system provides gel in quantity to the spray head. Gel is preferably supplied as needed (without storage in the head) to reduce spray head weight.

The gel supply satisfies the storage, preprocessing (before application), and transport requirements of the gel for a particular installation of the dispensing system.

For example, gel used in system 100 is stored and used at ambient temperature in a bakery (from about 20 to about 30 degrees Celsius). Gel is fed under pressure to spray head 110. Gel supply and delivery system 112 responds to on/off control from dispensing controller 114 and provides operating status to dispensing controller 114 for safe and efficient operations. In particular, gel supply and delivery system 112 primarily includes a conventional positive displacement pump and conventional pressure regulator. The pump develops a pressure of about 200 psi (pounds per square inch) in a pressurized line. After transport to the operating area of head 110 (which may be overhead), the line is regulated to a low pressure of from 10 to 20 psi, which is compatible with conventional flexible hose. Flexible hose is used from the regulator to spray head 110 because head 110 is free to be moved by positioning system 116.

A positioning system establishes the placement and motion between the workpiece and the spray head by moving either or both for dispensing gel as needed for a particular application. Any conventional object handling system or robot may be included. For example, systems may be employed based on hydraulic, pneumatic, conveying, or positioning equipment together with proximity sensors, limit switches, timers, and/or motion/position monitoring equipment. The positioning system responds to ascend and descend commands (at one or more speeds) provided by conventional electrical signaling from the dispensing controller. The positioning system provides, by similar signaling, mechanical status (including position, direction, and motion of the spray head) and operating status (including power, fluid pressures, temperatures, etc.) for safe and efficient positioning control.

Positioning system 116, for example, primarily includes a source of clean pressurized air, a pneumatic cylinder, a position sensing assembly, and an arm for mounting spray head 110. Position and movement of the arm by the cylinder is detected by magnetic proximity switches located to detect metal features of the position sensing assembly. Positioning system 116 moves spray head 110 primarily in a vertical axis. The pneumatic cylinder has a reach of several feet. Air pressure is supplied by one or more pumps to maintain a regulated pressure of about 120 psi. Conventional pneumatic equipment design techniques are used to obtain the ascent and descent speed, mechanical responsiveness, positioning accuracy, and repeatability (about plus or minus 0.5 inch). Variations having low spray head weight are more likely to meet design goals for low initial costs. Positioning system 116 responds to conventional low voltage electrical control signals for two descend speeds and two ascend speeds; and, provides conventional switch contact closures for reporting selected spray head positions and equipment status.

A spray head of the present invention distributes gel in a controlled manner to avoid waste of the gel and to avoid the aforementioned problems of the prior art, especially those problems related to overspray. Such a spray head primarily includes a valve in series with the supply of the gel and a distributor that broadcasts the gel in one or more repeatable, predetermined spray patterns. The valve and distributor respond to on/off or proportional control signals for controlling the timing and extent of valve operation and the timing, direction, and motion of the distributor. Such a spray head may provide status signals to the dispensing controller, for example, fail safe motion or position signals or characteristics of gel quantity or quality at the spray head.

For example, spray head 110 distributes gel with a horizontal and a vertical spray pattern suitable for applying release agent to the interior surfaces of a bakery trough without adversely affecting the safety and hygiene of a bakery production line environment. Spray head 110 is a particularly light weight assembly, discussed in detail below, for example, with reference to FIG. 4. Spray head 110 in a variation includes a gel flow monitor (suitable for detecting a failure in the gel delivery system) and a motion sensor (suitable for detecting unexpected motion near the spray head for personnel and equipment safety).

A dispensing controller provides initialization, timing, and operating sequence control for operating one or more (possibly different) gel supply and delivery systems, one or more positioning systems (for workpieces and/or spray heads), and one or more spray heads. Particularly, the dispensing controller initiates system operations, controls dispensing of the gel in a safe and efficient manner, and cooperates with peripheral equipment (not shown) as may be desired in a production environment. A dispensing controller may primarily include one or more conventional programmable logic controllers (PLC), specifically programmed for performing the functions of a dispensing controller. The PLC design approach provides flexibility to economically meet changing production requirements.

For example, system 100 includes one gel supply and delivery system 112, one positioning system 116, and one spray head 110 for describing exemplary embodiments of the present invention. Dispensing controller 114 receives analog, digital, and contact closure signals from gel supply and delivery system 112, positioning system 116, and spray head 110. Dispensing controller 114 integrates the information conveyed by these signals and provides analog, digital, and proportional control signals according to a method of operation of the present invention discussed in detail below, for example with reference to FIG. 6. Cooperation of the various components of system 100 according to such a method is maintained primarily by a conventional digital PLC, programmed using conventional programming techniques.

A dispensing system of the present invention may be used to dispense a gel onto one or more surfaces of an object. It is particularly useful for dispensing a gel onto the interior of a vessel, which may include one or more interior surfaces to be coated evenly, quickly, repeatably, and with minimal waste of material. One or more spray heads may be introduced into the vessel independently, in cooperation, or sequentially.

Figure 1:
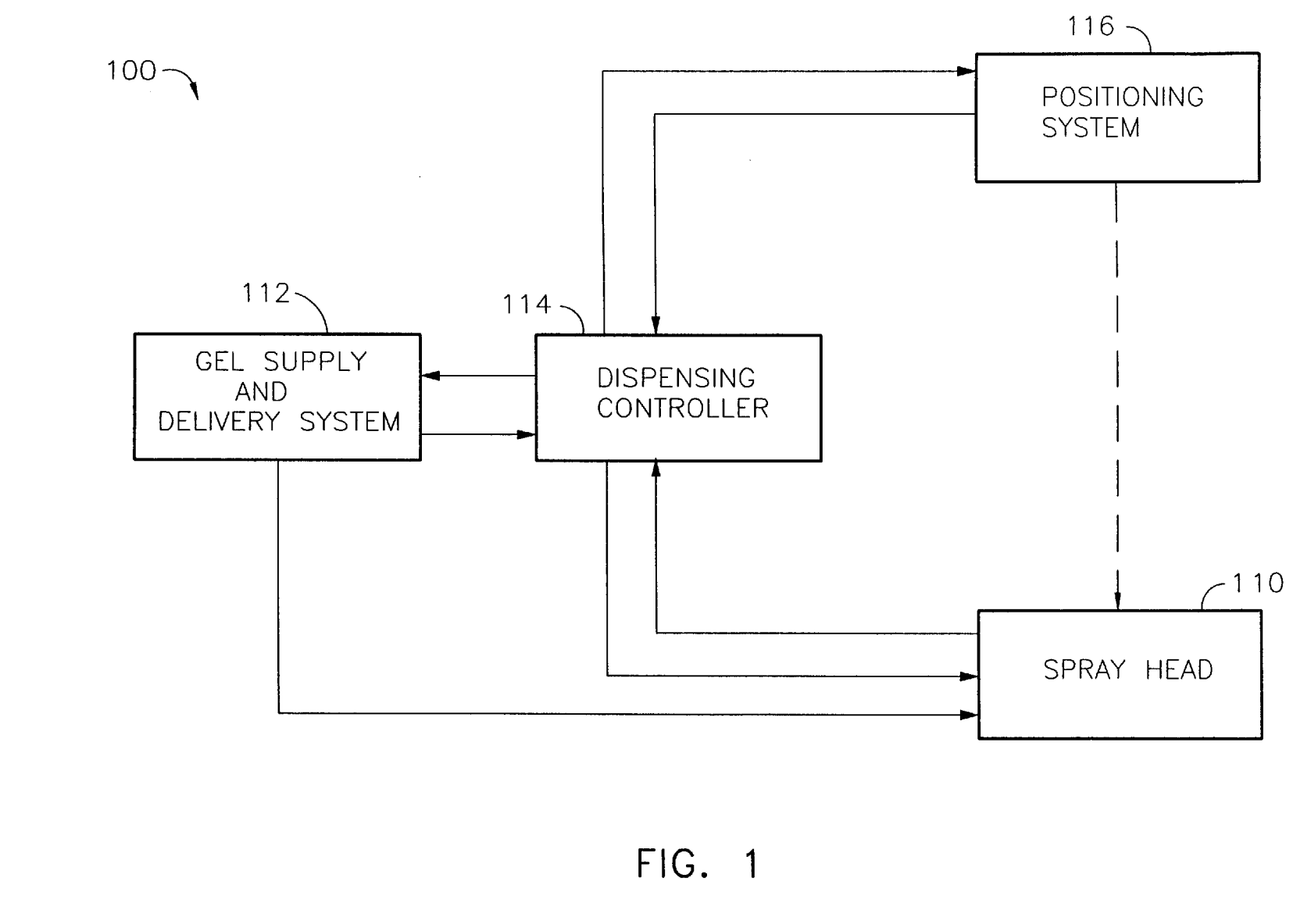
Figure 2:
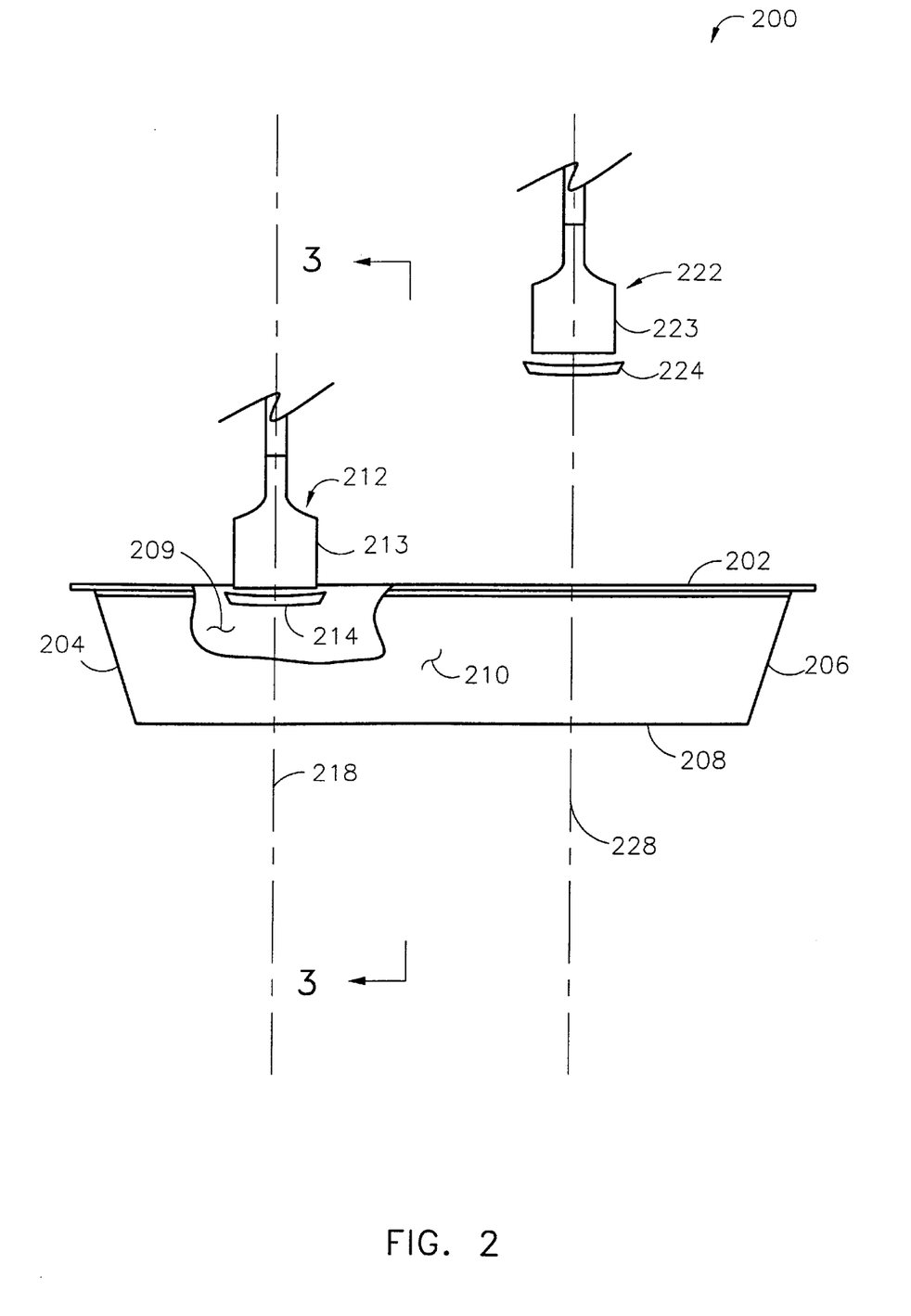

For example, system 200 of FIG. 2 applies release agent to bakery trough 202 using two spray heads 212 and 222. Trough 202 includes end walls 204 and 206, sidewalls 209 and 210, and bottom wall 208. Spray heads 212 and 222 respectively include motor assembly 213 and 223, and distributor 214 and 224. Each spray head 212 and 222 ascends and descends along a respective vertical axis 218 and 228. In operation, gel broadcast from distributor 214 is applied simultaneously to the respective interior surface of bottom 208, end wall 209, and side walls 209 and 210. To avoid waste of gel that could be applied by distributor 214 onto spray head 222, spray head 222 is kept out of the spray patterns of distributor 214, and vice versa.

In system 200, motion of trough 202 stops prior to entry of a spray head into trough 202 and remains stopped until even broadcast over all interior surfaces has been accomplished. An alternate to system 200 has one spray head, but requires relative movement between the spray head and the trough for the relative dimensions illustrated in FIG. 2. Two spray heads 212 and 222 are preferred for system 200 because release agent should be evenly broadcast over the interior surfaces of trough 202, repeatable motion of the trough would be difficult to maintain, and a simple interface between the trough positioning system (not shown) and dispensing controller portions of system 200 was desirable.

A spray head of the present invention effectively distributes gel onto interior surfaces of a vessel having an opening and an interior surface. Vessels include, all conventional vessels, and for example, pipes and bores, as well as enclosures having an opening, transport trays, and troughs. Distribution onto an interior surface of a vessel is accomplished by a distributor that spins on an axis to simultaneously prepare the gel for broadcast and form one or more spray patterns.

Figure 3:
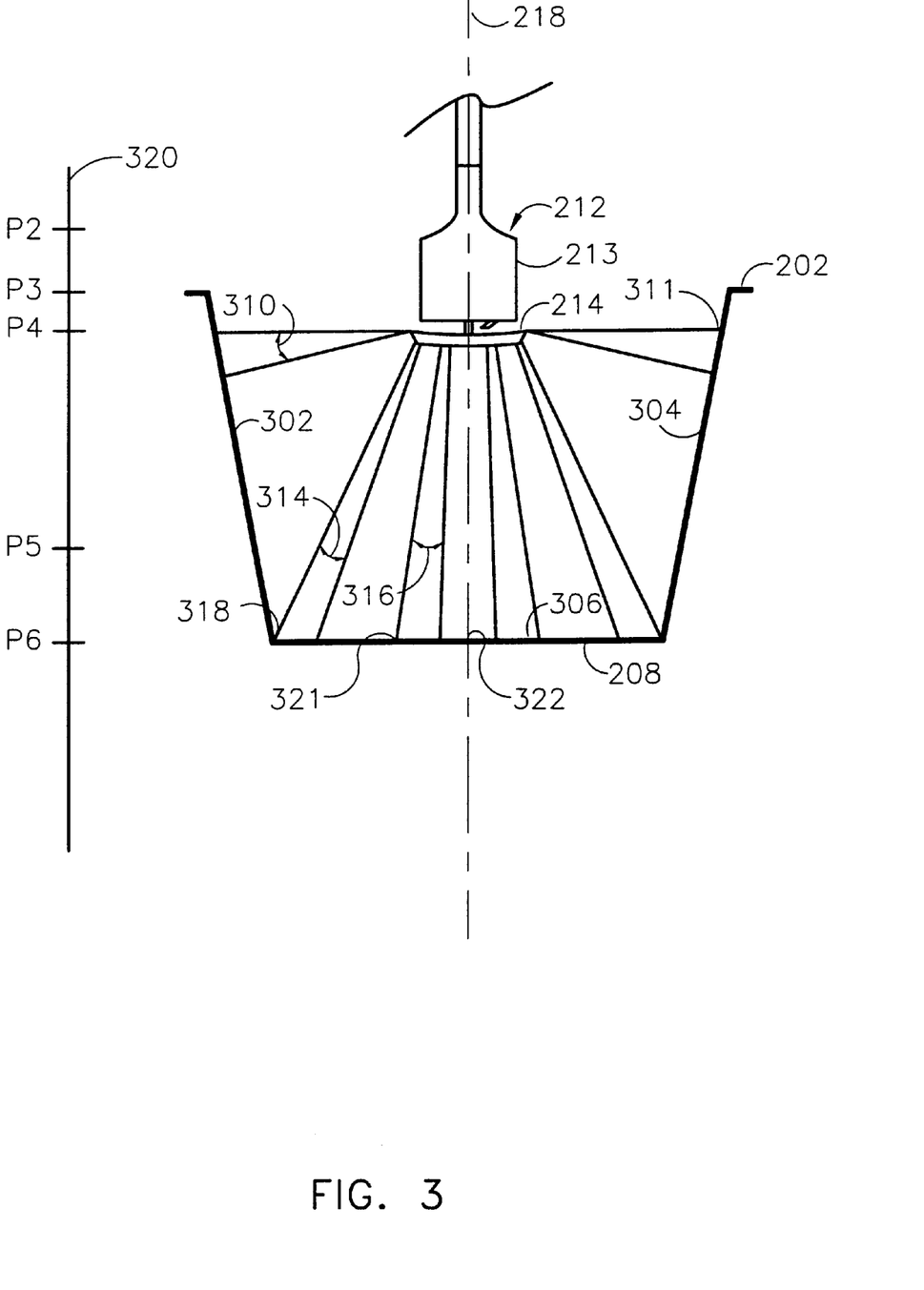

For example, head 212 in operation broadcasts gel as illustrated in FIG. 3. In FIG. 3, head 212 is centrally located between side wall interior surfaces 302 and 304 of trough 202. Motor assembly 213 spins distributor 214 on axis 218. Hence, the axis of vertical entry of head 212 into trough 202 is also axis 218. Distributor 214 spins in a plane substantially perpendicular to axis 218. Therefore, spray patterns formed by distributor 214 (due to features discussed below, for example with reference to FIGS. 4 and 5) are in a first case substantially horizontal and in other cases substantially circular against interior surfaces. Spray patterns are repeatable in a preferred embodiment due in part to operation of the motor at constant rotation and operation of the pump supplying gel at constant pressure while gel is being broadcast.

Spinning distributor 214 forms three spray patterns. Pattern 310 forms a substantially horizontal band on inner surfaces 302 and 304 and has a well defined uppermost extent 311. Pattern 314 forms a hollow outer circular band primarily on bottom interior surface 306. Pattern 316 forms a hollow inner circular band on bottom interior surface 306. Spray pattern 310 is greatly exaggerated. In practice angle 310 is less than 10 degrees (typically about 1 degree) due in part to the uniformity of droplet size.

Axis 320 defines vertical positions P2 through P6 for reference. Position P3 corresponds to the upper extent of trough 202. Gel that escapes trough 202 above position P3 constitutes overspray. Position P4 indicates the position of head 212 when spraying begins. Position P5 indicates the lowest position into trough 202 that head 212 travels. Position P6 indicates the vertical position of the bottom interior surface 306.

As head 212 descends on axis 218, patterns 310, 314 and 316 move across interior surfaces 302, 304, and 306. The region of bottom interior surface between point 318 and point 321 is covered by pattern 314. The region of bottom interior surface between points 321 and 322 is covered by pattern 316.

The structure of a head of the present invention provides a balanced, light weight motor assembly for ease of moving the head in relation to a workpiece and provides a sealed cavity that simplifies application of the head to clean environments, for example, in food processing applications. A distributor of the present invention receives gel to be dispensed, and causes droplets of gel of a uniform size to be broadcast in predetermined patterns without allowing gel to become airborne except within the spray pattern. Particularly, splashing of the gel when it is delivered onto the distributor is avoided; and, generally propelling the gel into the atmosphere is also avoided. In addition, the movement of gel immediately prior to being dispensed from the distributor includes both an axial vector component and a planar vector component. The axial component is preferably upward and greater than the planar vector component.

For example, head 212, in the cross section view of FIG. 4, includes motor assembly 213 and distributor 214. Motor assembly 213 includes shroud 402, base 404, mounts 406, motor 408, having a shaft 409 extending through bearing 407, valve mounting bracket 410, valve 412, and feed tube 414. Some features were omitted for clarity, including primarily a gel supply hose which connects valve 412 to gel supply and delivery system 112 and an electrical cable which connects dispensing controller 114 to valve 412 and motor 408.

Light weight components for motor assembly 213 are preferred. For example, any light weight motor may be used in variations for motor 408. Motor 408 is preferably of the conventional variable rotation speed, low voltage DC type having a printed circuit armature. In one variation, motor 408 is model GPM12M4 marketed by Printed Motors Limited, Hampshire, U.K.

Balance is achieved by arranging mounting of the various components symmetrically about axis 218 which is central to head 212 and motor shaft 409. Valve 412 is rigidly mounted with bracket 410 and motor 408 on mounts 406. Motor mounts 406 provide mechanical shock absorption to a limited extent and minimize wear in bearing 407.

Shroud 402 encloses motor assembly 213 by sealing onto base 404. Shroud 402 also provides mechanical mounting for head 212 onto arm 401, which is a component part of positioning system 116. Feed tube 414 has an axis 442 on which gel is delivered. Axis 442 makes angle 444 of about 45 degrees to axis 218.

A distributor of the present invention may have circular symmetry. In a preferred configuration, a distributor is formed as a solid disc of light weight material. A machined disc of acetal is preferred, however many variations are workable, including for example, cast plastics and machined or stamped metal sheet. Some important features of the geometry of a distributor of the present invention include a recess for receiving delivered gel, an area for the formation of gel droplets, an edge for the provision of a well defined spray pattern (substantially perpendicular to the axis of rotation), and an opening to allow passage of gel through the surface on which gel is delivered for a second spray pattern (for example, substantially parallel to the axis of rotation). Circular symmetry is advantageous because, for example, it allows a maximum area for droplet formation and simplifies feeding gel onto the distributor (coaxial or gated feed arrangements are thus avoided). Nevertheless, variations in geometry including single arm (channel), dual arm (tee), multiple arm (star), and polygon shapes (triangle, hexagonal, etc.) are workable for various applications. Although a knife edge is preferred at the extremity of the distributor, distributors with multiple concentric or coaxial edges (or other surface discontinuities) are workable.

Distributor 214 of FIG. 4 provides an example of preferred surface features. Distributor 214 includes hub 416, recess 418, platform 420, curved surface 422, and dispensing edge 424. Distributor 214 is made to spin dispensing edge 424 in a narrow, substantially horizontal, planar band, preferably one plane. Hub 416 and recess 418 cooperate to receive delivered gel with a reduced tendency for splashing. Platform 420 extends away from hub 416 at a slight incline of from 1 to 10 degrees, preferably about 2 degrees from horizontal. Centrifugal force and angular momentum combine to break globs of gel into an evenly distributed film on platform 420. The incline of platform 420 also operates on the gel to control the rate of outward delivery of gel away from hub 416. Upwardly curved surface 422 presents a region of high centrifugal force against the gel. Preferably, dispensing edge 424 is sharp, releasing all gel from one formation.

Figure 4:
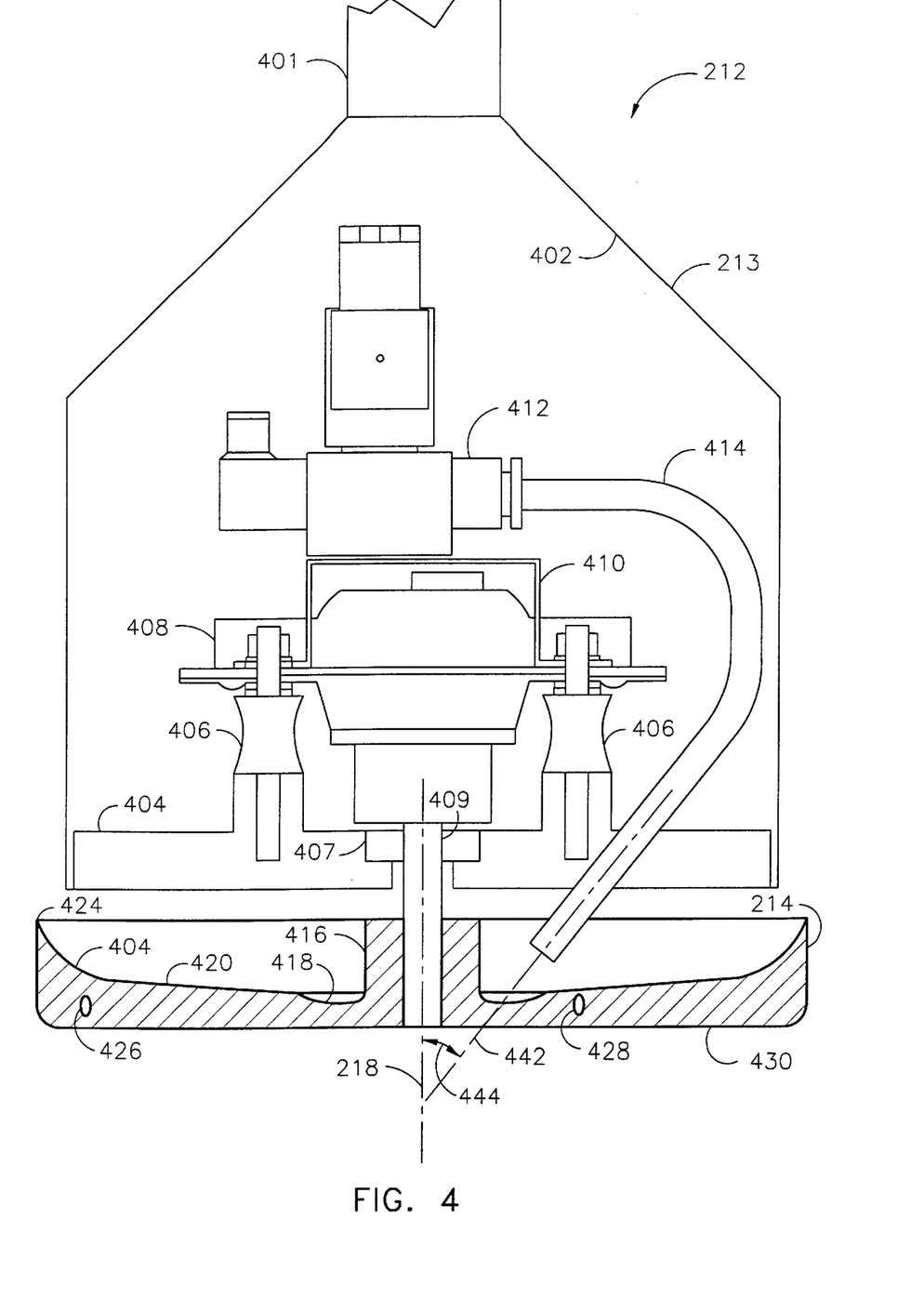

Motion of the gel on its approach to dispensing edge 424 includes an axial vector component and a planar vector component with reference to axis 218 and the plane of edge 424. In addition, the axial vector component is preferable of greater magnitude than the planar vector component. For example, gel dispensed away from edge 424 approaches edge 424 in an increasingly vertical direction that is upward toward base 404. In a variation curved surface 422 is replaced with an essentially flat surface that makes an angle from axis 218 of from 10 to 60 degrees, preferably 45 degrees. In this variation, the vertical vector component is substantially constant rather than increasing as in the case of a concave radius used for surface 422 (as shown in FIG. 4).

The radius (in the vertical plane) and/or treatment of the broadcasting edge of a distributor of the present invention may vary. A single sharp edge as shown in FIG. 4 is preferred; however a dull, bulbous, or multiple edge formation may be used, depending, for example, on choice of materials, especially the material at the point of broadcast, life expectancy of the edge, characteristics of the gel, importance of self cleaning operation, and whether operation is continuous or divided by lapses during which gel may form a residue on distributor 214. A distributor of the present invention includes a number of holes formed completely through the vertical thickness of the distributor. Hole diameter is selected on a variety of factors including, for example: gel viscosity, distributor spin rate, distance of the hole from axis 218, desired coverage of the downward spray patterns, and desired self cleaning properties of the distributor.

Figure 5:
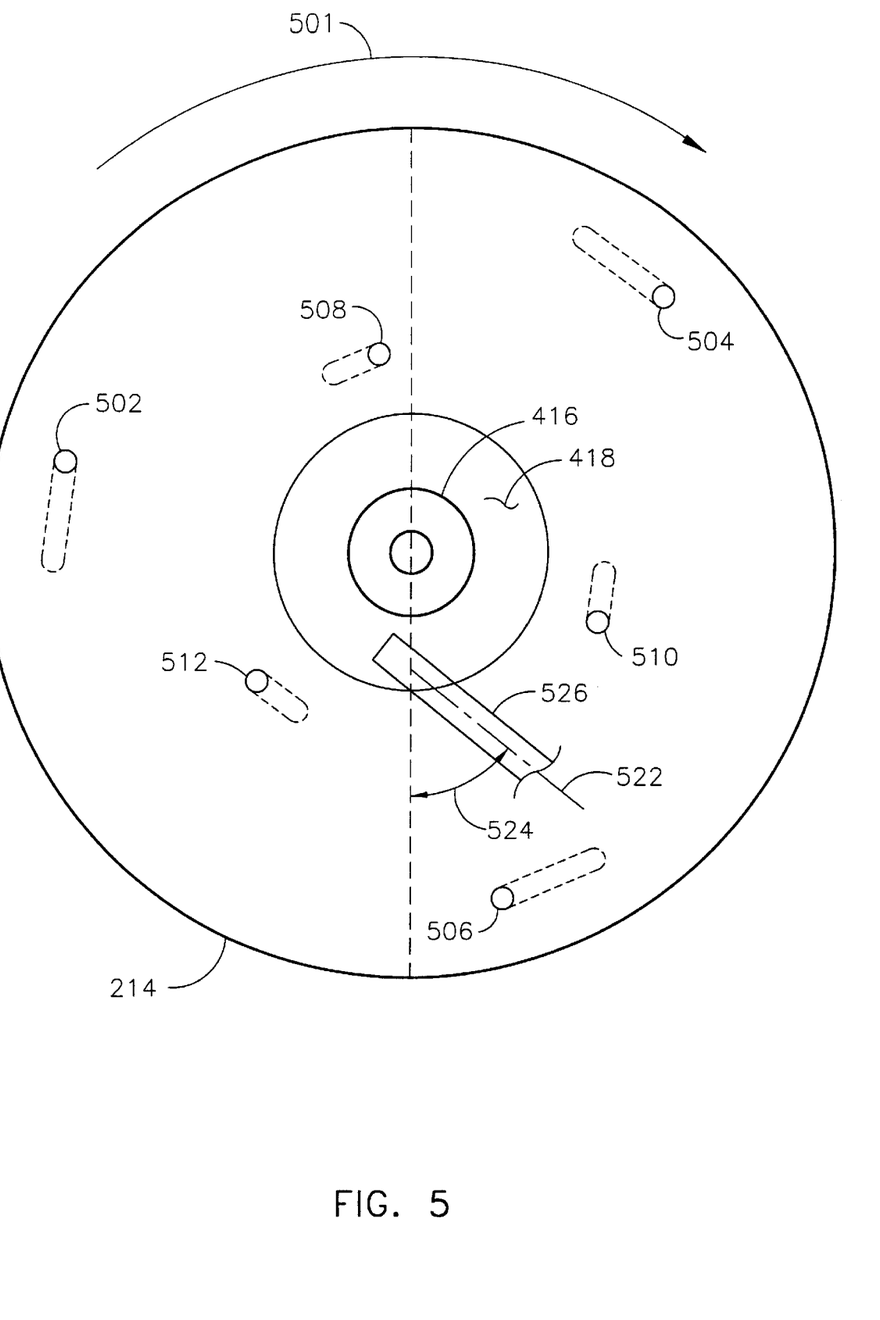

For example, distributor 214 includes hole 426 and hole 428. Holes 426 and 428 are formed at an angle to axis 218 and appear as ovals in FIG. 4. Each hole 426 and 428 extends completely through distributor 214 from platform 420 to bottom surface 430. As shown in FIG. 5, a top view of distributor 214, distributor 214 includes an outer ring of holes 502, 504, and 506; and, an inner ring of holes 508, 510, and 512. Each hole is formed on an angle to the horizontal plane of distributor 214 and in a top to bottom direction opposite spin direction 501. The number of holes in each ring may vary to meet spray pattern requirements. In the variation shown in FIGS. 3 through 5, two rings of holes are used and all holes are of the same diameter for simplicity of manufacture and uniformity of the resulting spray patterns. In a variation, spin direction is counter-clockwise and holes are again formed in a top to bottom direction opposite the spin direction.

To reduce the tendency of splashing of gel when delivered onto a spinning distributor, feeding of the gel should be at an angle to a diameter of the distributor. For example, feed tube 526 has an axis with a vector component 522 in the plane of distributor 214 that makes an angle 524 measured in the plane with reference to diameter 520. Angle 524 is in the range from 10 to 90 degrees, preferably about 45 degrees.

Methods of the present invention dispense gel onto a surface with minimal overspray. For example, a method 600 of FIG. 6 for operating system 200 of FIG. 2 is further illustrated with a timing diagram of FIG. 7. The timing diagram describes head positions and electrical signals. Axis 701 provides indications of positions corresponding to axis 320 of FIG. 3. Trace 702 follows head 212 and trace 704 follows head 222. Portions of the position and time axes are expanded to clarify the presentation. Electrical signals (M1, V1, M2, V2, and ENTER_OK) are described in digital format for convenience.

Figure 7:
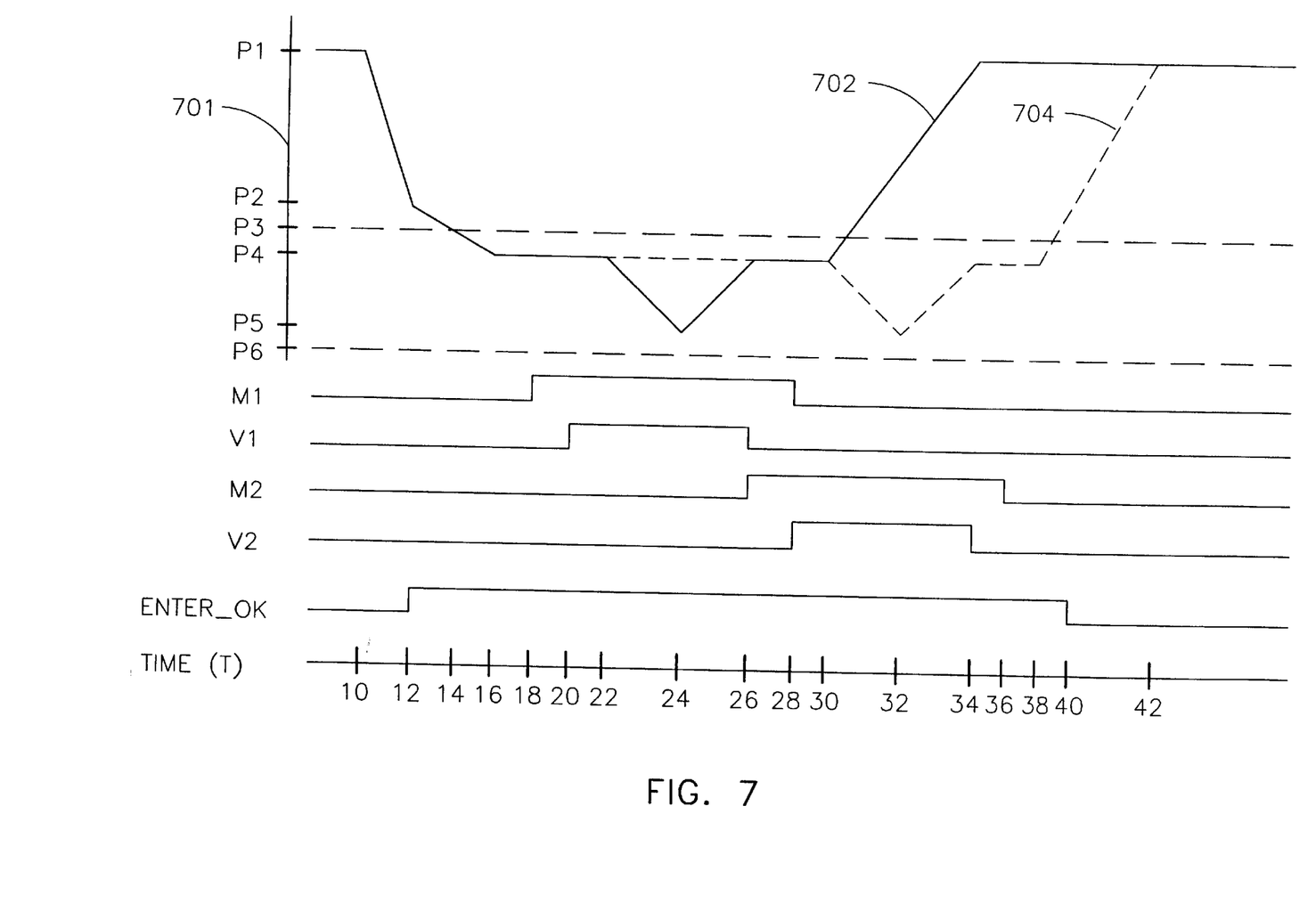

System 200 is capable of two rates of speed for ascent and descent of heads 212 and 222: a fast rate, and a slow rate. Motion of each head is independent of the other and simultaneous motion is advantageously used.

Figure 6:
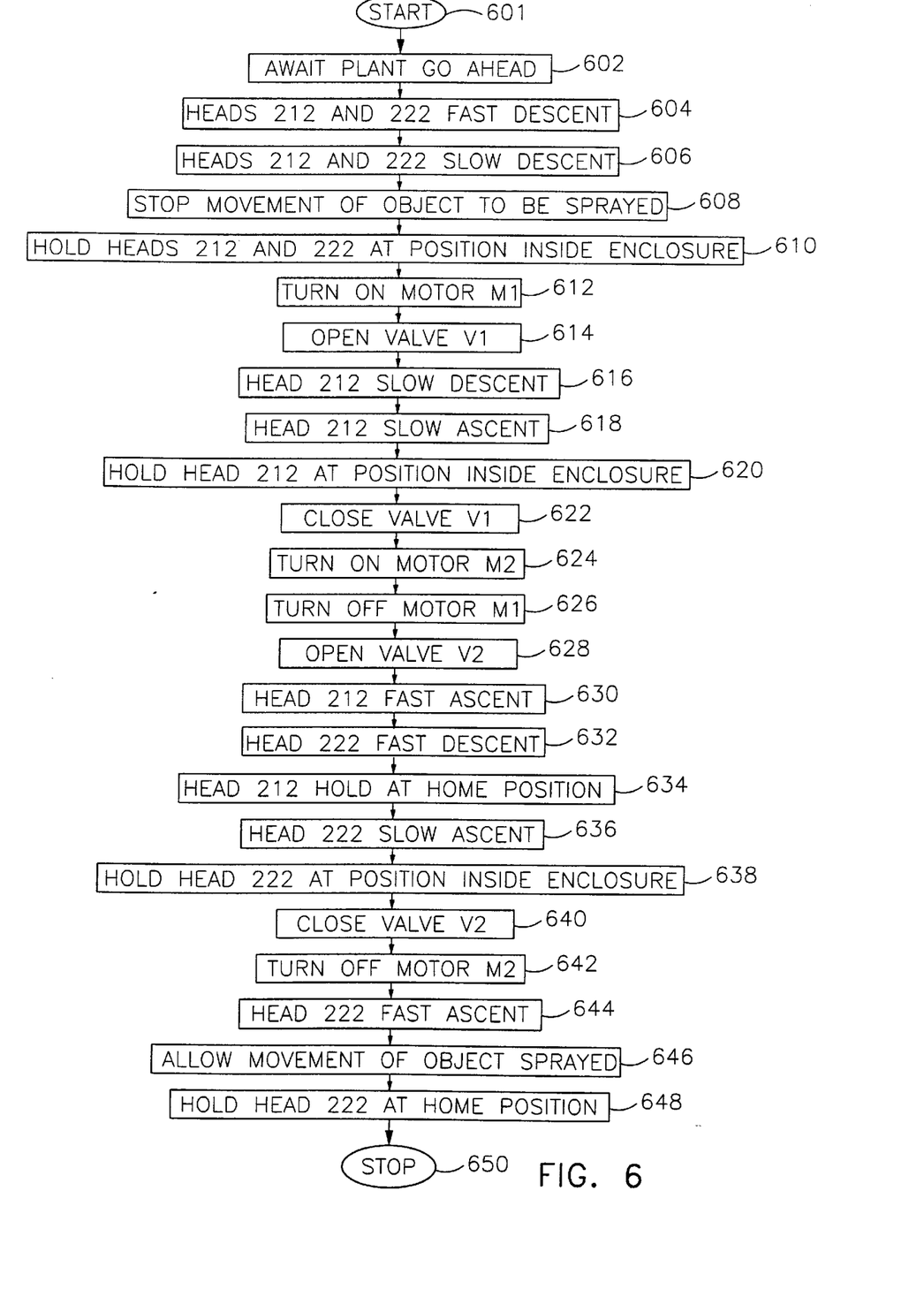

At step 601, initialization of system hardware and software is accomplished, making the system ready for a cycle involving one bakery trough.

At step 602, prior to time T10, the system awaits a signal from the plant. Heads 212 and 222 are stationary at position P1 over a trough transport conveyor system. The plant is responsible for positioning trough 202 stationary under heads 212 and 222. The go-ahead signal is given when a trough approaches. The time spent for moving the heads into position overlaps the time spent for final positioning of the trough. Conventional hardware, software, and signalling techniques provide detection of the position and motion of trough 202.

At step 604, system 200 has received a go-ahead signal at time T10 and heads 212 and 222 descend at a fast rate.

At step 606, system 200 has received signal ENTER_OK from the plant at time T12 and heads 212 and 222 continue descent at a slow rate. At time T14, heads 212 and 222 enter trough 202 as indicated by position P3.

At step 608, corresponding to times T16 to T18, the plant is responsible for stopping movement of trough 202. Final adjustments of position may be accomplished during this step.

At step 610, corresponding to times T16 to T22, heads 212 and 222 are held at position P4 inside trough 202.

At step 612 and time T18, motor M1 of head 212 is turned on. Distributor 214 begins rotating at a speed that quickly increases to a set point speed at time T20 of between 500 and 3000 revolutions per minute (RPM), set to establish the patterns 310, 314, and 316 without excessive splashing of release agent against the interior walls (e.g. 302, 304, and 306) of trough 202.

At step 614 and time T20, valve V1 of head 212 is fully opened.

At step 616, corresponding to times T22 to T24, head 212 descends at a slow rate into trough 202, dispensing release agent.

At step 618, corresponding to times T24 to T26, head 212 ascends at a slow rate, dispensing release agent.

At step 620, corresponding to times T26 to T30, head 212 is held at position P3 inside trough 202.

At step 622 and time T26, valve V1 is closed.

At step 624 and time T26, motor M2 of head 222 is turned on.

At step 626 and time T28, motor M1 is turned off. In a preferred embodiment, distributor 214 is not braked abruptly but coasts with decreasing RPM from time T28 to T30 to broadcast any release agent remaining on (or within) distributor 214. From time T28 to T30 distributor 214 coasts to accomplish self cleaning without allowing spray outside of trough 202.

At step 628 and time T28, valve V2 of head 222 is fully opened.

At step 630 and time T30, head 212 begins a fast ascent.

At step 632, corresponding to times T30 to T32, head 222 descends at a slow rate into trough 202, dispensing release agent.

At step 634 and time T32, head 212 has arrived at home position P1 and is held there ready for another cycle.

At step 636, corresponding to times T32 to T34, head 222 ascends at a slow rate, dispensing release agent.

At step 638, corresponding to times T34 to T38, head 222 is held at position P3 inside trough 202.

At step 640 and time T34, valve V2 is closed.

At step 642 and time T36, motor M2 of head 222 is turned off.

At step 644, and time T38, head 222 begins a fast ascent.

At step 646, heads 212 and 222 are clear of trough 202. System 200 so notifies the plant using an appropriate signal and the plant acknowledges receipt of such a signal by removing the ENTER_OK signal. The plant is then enabled to move trough 202 as desired.

At step 648, head 222 has arrived at home position P1 and is held there ready for another cycle.

At step 650, system 200 may begin shut down, for example, to reduce power consumption, to begin reporting diagnostics, or to discontinue use. Or, control may flow back to step 602 in anticipation of another cycle.

In some applications, the gel to be used may dictate design features of the spray head including motor rotation speed, distributor diameter, thickness, edge structure, hole diameter, placement, and angle through the thickness, as well as control features including timing of application and removal of power to the motor, the possible need for braking of distributor rotation, and the timing, application, and removal of gel on the distributor. In other applications characteristics of the gel may be selected to be compatible with system design goals. In the latter case, gels may be prepared in any conventional manner.

Figure 8:
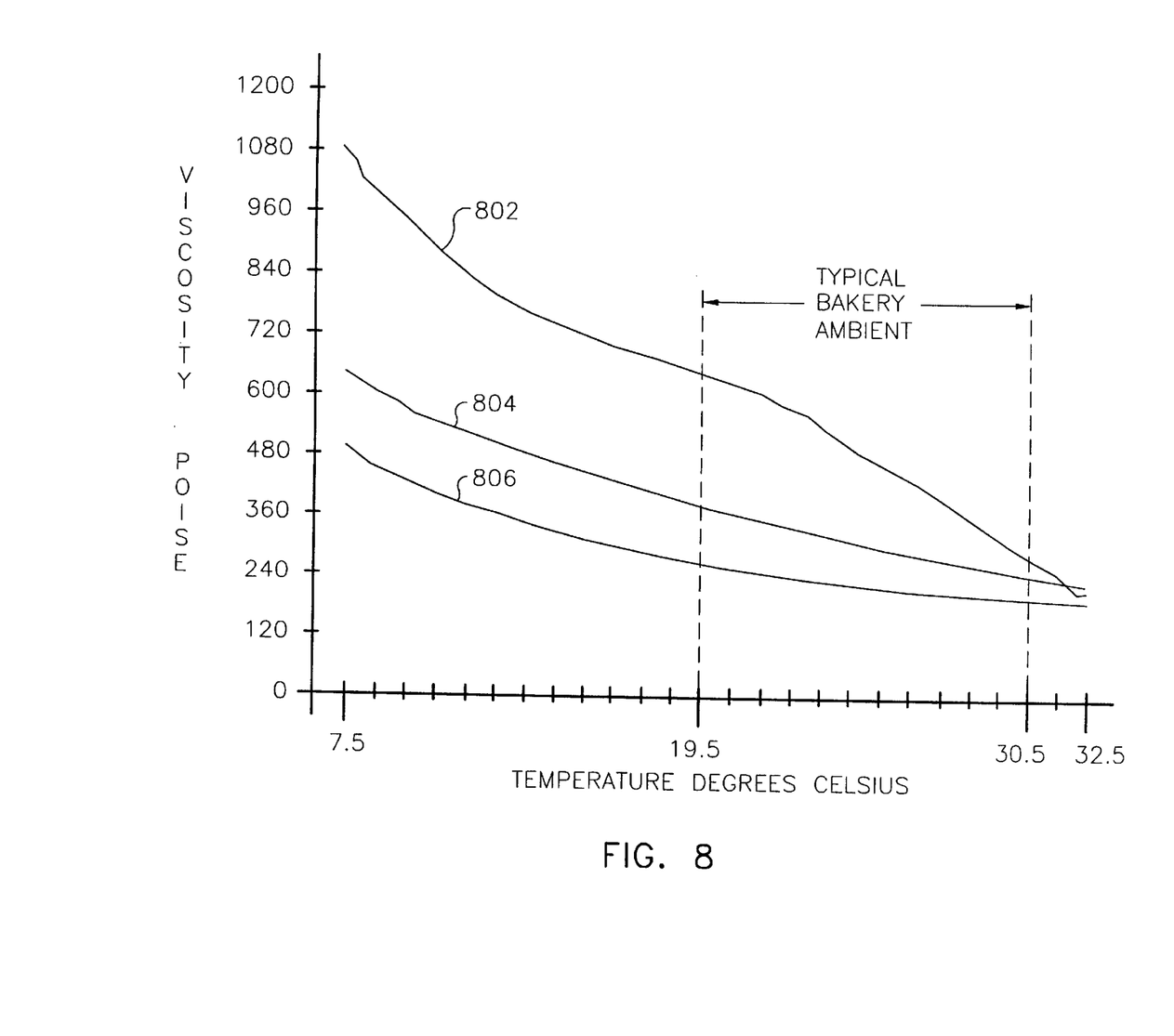

Three examples of release agent for use in system 100, are specified in the following table with measured properties described in FIG. 8.

| Example | Primary Component | Percentage by Weight |
|---------|-------------------|---------------------|
| 802 | Soya Oil | 94% |
|  | Hardened Palm Oil | 6% |
| 804 | Soya Oil | 92% |
|  | Hardened Cottonseed Oil | 8% |
| 806 | Rapeseed Oil | 87% |
|  | Refined Lecithin | 7% |
|  | Hardened Palm Oil | 6% |

In each of gels 802 through 806, primary components are combined using well known mixing, heating, and cooling techniques to achieve homogeneity and stability within the gel. For example, a release agent including primarily soybean oil and partially hydrogenated cottonseed oil may be combined by conventional techniques to form a fluid gel that is stable for several months when stored at 18 to 24 degrees Celsius.

Overspray and other problems of the prior art are avoided by systems and methods of the present invention. The present invention has been described in the preferred embodiments. Several variations and modifications have also been described and suggested. Other embodiments, variations, and modifications known to those skilled in the art may be implemented without departing from the scope and spirit of the invention as recited in the claims below.

What is claimed is:

1. A system for dispensing a gel, the system having an input for receiving the gel, the system comprising:
   a. a distributor comprising:
      (1) a hub having an axis of rotation; and
      (2) a surface that turns with the hub and that extends away from the axis toward an edge of the surface, the surface comprising an opening for passage of the gel through the surface; and
   b. a motor, coupled to the hub, that spins the distributor on the axis, thereby dispensing the gel in a first pattern off the edge and in a second pattern through the opening.

2. The system of claim 1 wherein the distributor comprises a disc.

3. The system of claim 1 wherein the motor comprises a printed circuit armature.

4. The system of claim 1 wherein:
   a. the distributor has a thickness;
   b. the opening extends through the thickness; and
   c. the opening has a second axis at an angle to the axis of the hub.

5. The system of claim 1 wherein:
   a. the distributor has a thickness;
   b. the opening extends through the thickness; and
   c. the opening has a second axis skewed from the axis of the hub.

6. The system of claim 1 wherein the edge is shaped to control motion of the gel so that, prior to leaving the edge, the motion of the gel comprises a vertical vector component and a horizontal vector component.

7. The system of claim 6 wherein the vertical vector component is parallel to the axis of the hub.

8. The system of claim 6 wherein the horizontal vector component and the vertical vector component each have a respective magnitude and the magnitude of the vertical vector component is greater than the magnitude of the horizontal vector component.

9. The system of claim 1 further comprising a tube for delivery of the gel to the surface, wherein the tube has a second axis skewed from the axis of the hub.

10. The system of claim 1 wherein the surface comprises a recess into which the gel is delivered.

11. The system of claim 1 further comprising a support that carries the motor and that positions the first pattern and the second pattern for dispensing the gel.

12. The system of claim 11 wherein the support moves the first pattern in a direction along the axis of the hub.

13. The system of claim 1 further comprising a valve in series fluid communication with the input, wherein the valve regulates delivery of the gel onto the distributor.

14. The system of claim 13 further comprising a controller that commands opening of the valve in concert with controlling the rotation of the motor.

15. A method for operating the system of claim 14 to dispense the gel into a vessel having an opening and an interior surface, the method comprising:
   operating the support to introduce the distributor through the opening;
   initiating rotation of the distributor; and
   opening the valve when the distributor is rotating and is positioned to dispense the gel onto the interior surface.

16. The method of claim 15 further comprising operating the support to move the pattern along the vessel interior surface.

17. The method of claim 16 further comprising in sequence:

closing the valve;

reducing distributor rotation; and operating the support to remove the distributor from the vessel opening.

18. The method of claim 15 further comprising in sequence:

closing the valve;

reducing distributor rotation; and operating the support to remove the distributor from the vessel opening.

19. The system of claim 1 wherein the distributor further comprises a tube in fluid communication with the input for supplying gel to the surface.

20. The system of claim 1 wherein the distributor comprises an arm that provides the surface.

21. The system of claim 1 wherein the edge forms a regular polygon about the hub.

22. The system of claim 1 wherein the edge forms a circle about the hub.

23. The system of claim 1 wherein the surface comprises an incline with respect to gravity as the surface extends away from the hub.

24. The system of claim 23 wherein the incline has an angle in the range of about 1 to about 10 degrees from a plane perpendicular to the axis of the hub.

25. The system of claim 1 wherein the distributor further comprises a tube in fluid communication with the input for supplying gel to the surface.

26. The system of claim 1 wherein surface comprises a sloped region adjacent to the edge, the sloped region for increasing centrifugal force on the gel.

27. The system of claim 26 wherein the sloped region in cross section exhibits a curve.

28. The system of claim 26 wherein the sloped region in cross section exhibits a linear slope having an angle in the range of about 10 to about 60 degrees from a plane perpendicular to the axis of the hub.

29. The system of claim 1 wherein supply of the gel is at a supply angle to a diameter of the distributor.

30. The system of claim 29 wherein:

a. the surface comprises a circular region having a center in the axis of the hub;

b. the gel is supplied by a tube having a second axis;

c. the second axis has a vector component on the surface, the vector component intersecting a diameter of the circular region;

d. the vector component and the diameter form an angle in the range of about 10 to about 90 degrees.

31. A method of applying a gel in an interior of a vessel, the vessel having an opening, the method comprising in sequence:

providing a head and a positioning system, the positioning system for relative positioning of the head and the vessel, wherein the head receives gel from a supply the head comprising:

(1) a distributor having a thickness, having a hole through the thickness, and having an edge;

(2) a motor that spins the distributor; and (3) a valve in series with the supply, wherein the valve regulates delivery of the gel onto the distributor;

providing gel to pass through the hole when the distributor spins, to cooperate with the edge, and to broadcast droplets of gel off the edge;

when the motor is spinning the distributor, opening the valve to initiate delivery of the gel onto the distributor, to form inside the vessel: a first spray pattern off the edge and a second spray pattern through the hole;

changing the relative position of the head and the vessel to relocate inside the vessel the first spray pattern and the second spray pattern;

closing the valve while the distributor continues spinning; and decreasing distributor spin to eliminate overspray.

32. The method of claim 31 further comprising:

before the step of opening the valve, positioning the head inside the vessel; and after the step of decreasing distributor spin, positioning the head outside the vessel.

33. The system of claim 31 wherein the gel comprises a release agent.

34. A system for dispensing a gel onto a provided vessel, the system having an input for receiving the gel, the system comprising:

a. a head comprising:

(1) a distributor comprising:

(a) a hub having an axis of rotation; and (b) a surface that turns with the hub and that extends away from the axis toward an edge of the surface, the surface comprising an opening for passage of the gel through the surface;

(2) a motor, coupled to the hub, that spins the distributor on the axis, thereby dispensing the gel in a first pattern off the edge and in a second pattern through the opening; and b. a positioning system that establishes a position of the head with respect to the vessel.

35. The system of claim 34 wherein the head further comprises:

a. a base that supports the motor, the motor being coupled to the hub through an aperture in the base; and b. a shroud that couples the positioning system to the base to support the base.

36. The system of claim 35 wherein the shroud provides a barrier to contamination of the motor by the gel.

37. The system of claim 34 wherein the positioning system moves the head with respect to the vessel at a first steady state speed and at a second steady state speed less than the first speed.

38. The system of claim 37 wherein the positioning system moves the head into the provided vessel for dispensing gel onto an interior surface of the vessel.

39. The system of claim 34 wherein:

a. the system further comprises a second head for dispensing the gel; and b. the positioning system establishes a second position of the second head with respect to the vessel.

40. The system of claim 39 further comprising a controller wherein the positioning system independently positions the head and the second head in response to the controller.

41. The system of claim 34 further comprising a controller wherein:

a. the positioning system positions the head in response to the controller; and b. the motor spins the distributor in response to the controller.

42. The system of claim 41 wherein the controller comprises a programmable logic controller.

43. The system of claim 41 wherein the head further comprises a gel flow sensor for sensing a flow of gel to the surface, the sensor coupled to the controller for controlling at least one of the position of the head and the spinning of the distributor.

44. The system of claim 41 wherein the head further comprises a motion sensor coupled to the controller for controlling at least one of the position of the head and the spinning of the distributor.

45. The system of claim 41 wherein the head further comprises a valve coupled to the controller for regulating the supply of gel to the surface.

46. The system of claim 45 wherein the controller provides proportional control of the valve.

47. The system of claim 41 wherein the controller comprises a regulator for regulating the pressure of gel supplied to the distributor.

48. The system of claim 41 wherein the controller comprises a regulator for regulating the speed of the motor.

* * * * *